(12) United States Patent
Frantz et al.

(10) Patent No.: US 8,932,546 B2
(45) Date of Patent: Jan. 13, 2015

(54) CATALYTICALLY ACTIVE PARTICULATE FILTER AND USE THEREOF

(71) Applicant: Umicore AG & Co. KG, Hanau-Wolfgang (DE)

(72) Inventors: Stephanie Frantz, Loerrach (DE); Ulrich Goebel, Hattersheim (DE); Franz Dornhaus, Rodgau (DE); Michael Schiffer, Hanau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 13/753,089

(22) Filed: Jan. 29, 2013

(65) Prior Publication Data
US 2013/0280150 A1    Oct. 24, 2013

Related U.S. Application Data

(60) Provisional application No. 61/595,703, filed on Feb. 7, 2012.

(30) Foreign Application Priority Data

Feb. 3, 2012   (EP) .................................... 12153774

(51) Int. Cl.
*B01D 53/94*    (2006.01)
*B01J 20/00*    (2006.01)
(Continued)

(52) U.S. Cl.
CPC ........... *B01D 53/9454* (2013.01); *B01J 37/024* (2013.01); *F01N 3/035* (2013.01);
(Continued)

(58) Field of Classification Search
CPC ............ B01J 23/42; B01J 23/44; B01J 21/00; B01J 29/068
USPC ......... 502/258, 259, 260, 261, 262, 263, 332, 502/333, 334, 339, 355, 415, 439, 66, 74, 502/527.12, 527.13; 422/170, 177, 180; 42/213.5
See application file for complete search history.

(56) References Cited

U.S. PATENT DOCUMENTS 7,062,904 B1    6/2006    Hu et al.
7,498,010 B2    3/2009    Andreasson et al.
(Continued)

FOREIGN PATENT DOCUMENTS

DE    10 2004 040 549 A1    2/2003
DE    10 2008 042 243 A1    4/2010
(Continued)

OTHER PUBLICATIONS

European Search Report for Application No. EP 12 15 3774 dated Jun. 11, 2012.

*Primary Examiner* — Cam N. Nguyen
(74) *Attorney, Agent, or Firm* — Smith, Gambrell & Russell, LLP

(57) ABSTRACT

A catalytically active particulate filter is proposed which is suitable for use in an exhaust gas cleaning system for diesel engines. The particulate filter removes diesel soot particles from the exhaust gas and is also effective to oxidize carbon monoxide and hydrocarbons and to convert nitrogen monoxide at least proportionally into nitrogen dioxide. The particulate filter comprises a filter body (3) and two catalytically active coatings (1) and (2) which contain platinum and palladium, or platinum or palladium respectively, wherein the platinum content of the second catalytically active coating (2) is higher than the platinum content of the first catalytically active coating (1).

13 Claims, 1 Drawing Sheet

(51) Int. Cl.

| | |
|---|---|
| *B01J 21/00* | (2006.01) |
| *B01J 21/04* | (2006.01) |
| *B01J 23/00* | (2006.01) |
| *B01J 23/02* | (2006.01) |
| *B01J 23/08* | (2006.01) |
| *B01J 23/42* | (2006.01) |
| *B01J 23/44* | (2006.01) |
| *B01J 23/56* | (2006.01) |
| *B01D 50/00* | (2006.01) |
| *B01J 37/02* | (2006.01) |
| *F01N 3/035* | (2006.01) |
| *B01J 35/00* | (2006.01) |
| *B01J 23/63* | (2006.01) |
| *B01J 29/12* | (2006.01) |
| *B01J 29/22* | (2006.01) |
| *B01J 29/44* | (2006.01) |
| *B01J 29/74* | (2006.01) |
| *B01J 35/02* | (2006.01) |
| *B01J 35/04* | (2006.01) |
| *B01J 35/10* | (2006.01) |
| *B01J 27/224* | (2006.01) |

(52) U.S. Cl.
CPC ......... *B01J 37/0244* (2013.01); *B01J 37/0246* (2013.01); *B01J 35/0006* (2013.01); *B01J 23/44* (2013.01); *B01J 23/63* (2013.01); *B01J 29/123* (2013.01); *B01J 29/126* (2013.01); *B01J 29/22* (2013.01); *B01J 29/44* (2013.01); *B01J 29/7415* (2013.01); *B01J 35/023* (2013.01); *B01J 35/04* (2013.01); *B01J 35/1019* (2013.01); *B01D 53/944* (2013.01); *B01D 53/9468* (2013.01); *B01D 2255/1021* (2013.01); *B01D 2255/1023* (2013.01); *B01D 2255/50* (2013.01); *B01D 2255/912* (2013.01); *B01D 2255/9155* (2013.01); *B01D 53/9477* (2013.01); *B01J 27/224* (2013.01); *B01J 2229/42* (2013.01); *Y10S 502/52712* (2013.01); *Y10S 502/52713* (2013.01)
USPC ........ 423/213.5; 502/258; 502/259; 502/260; 502/261; 502/262; 502/263; 502/332; 502/333; 502/334; 502/339; 502/355; 502/415; 502/439; 502/527.12; 502/527.13; 502/66; 502/74; 422/170; 422/177; 422/180

(56) References Cited

U.S. PATENT DOCUMENTS

| | | | |
|---|---|---|---|
| 7,576,031 B2 * | 8/2009 | Beutel et al. | 502/339 |
| 7,875,573 B2 * | 1/2011 | Beutel et al. | 502/339 |
| 7,977,275 B2 | 7/2011 | Pfeifer et al. | |
| 8,006,485 B2 * | 8/2011 | Twigg et al. | 60/295 |
| 8,038,954 B2 * | 10/2011 | Li | 422/180 |
| 8,057,768 B2 | 11/2011 | Schneider et al. | |
| 8,220,251 B2 * | 7/2012 | Oger et al. | 60/286 |
| 8,246,923 B2 * | 8/2012 | Southward et al. | 423/213.5 |
| 8,252,258 B2 * | 8/2012 | Muller-Stach et al. | 423/213.2 |
| 8,263,033 B2 * | 9/2012 | Dobson et al. | 423/213.5 |
| 8,329,607 B2 * | 12/2012 | Kazi et al. | 502/66 |
| 8,524,182 B2 * | 9/2013 | Grubert et al. | 423/213.2 |
| 8,652,429 B2 * | 2/2014 | Sumiya et al. | 423/213.2 |
| 8,668,891 B2 * | 3/2014 | Blakeman et al. | 423/213.5 |
| 8,802,016 B2 * | 8/2014 | Grubert | 422/177 |
| 2006/0057046 A1 | 3/2006 | Punke et al. | |
| 2010/0275579 A1 | 11/2010 | Klingmann et al. | |
| 2011/0120093 A1 | 5/2011 | Eckhoff et al. | |
| 2011/0123421 A1 | 5/2011 | Grubert | |
| 2011/0212008 A1 * | 9/2011 | Punke et al. | 423/213.5 |
| 2011/0214412 A1 * | 9/2011 | Chiffey et al. | 60/274 |
| 2011/0286903 A1 | 11/2011 | Andreasson et al. | |
| 2012/0055141 A1 * | 3/2012 | Hilgendorff | 60/301 |
| 2012/0055142 A1 * | 3/2012 | Hilgendorff | 60/301 |
| 2012/0213674 A1 | 8/2012 | Schuetze et al. | |
| 2012/0255283 A1 * | 10/2012 | Oger et al. | 60/274 |
| 2013/0084222 A1 * | 4/2013 | Grubert et al. | 422/170 |
| 2013/0089481 A1 * | 4/2013 | Sumiya et al. | 423/213.5 |
| 2013/0142714 A1 * | 6/2013 | Sung et al. | 423/213.5 |
| 2013/0149223 A1 * | 6/2013 | Blakeman et al. | 423/213.5 |
| 2014/0186244 A1 * | 7/2014 | Blakeman et al. | 423/213.5 |
| 2014/0186245 A1 * | 7/2014 | Blakeman et al. | 423/213.5 |

FOREIGN PATENT DOCUMENTS

| | | |
|---|---|---|
| EP | 1 054 722 A1 | 11/2000 |
| EP | 1 486 248 A1 | 12/2004 |
| EP | 2 042 225 A1 | 4/2009 |
| EP | 2 112 339 A1 | 10/2009 |
| JP | 2008-264636 A | 11/2008 |
| WO | 99/39809 A1 | 8/1999 |
| WO | 2009/140989 A1 | 11/2009 |
| WO | 2011/057649 A1 | 5/2011 |
| WO | 2011/061321 A1 | 5/2011 |

* cited by examiner

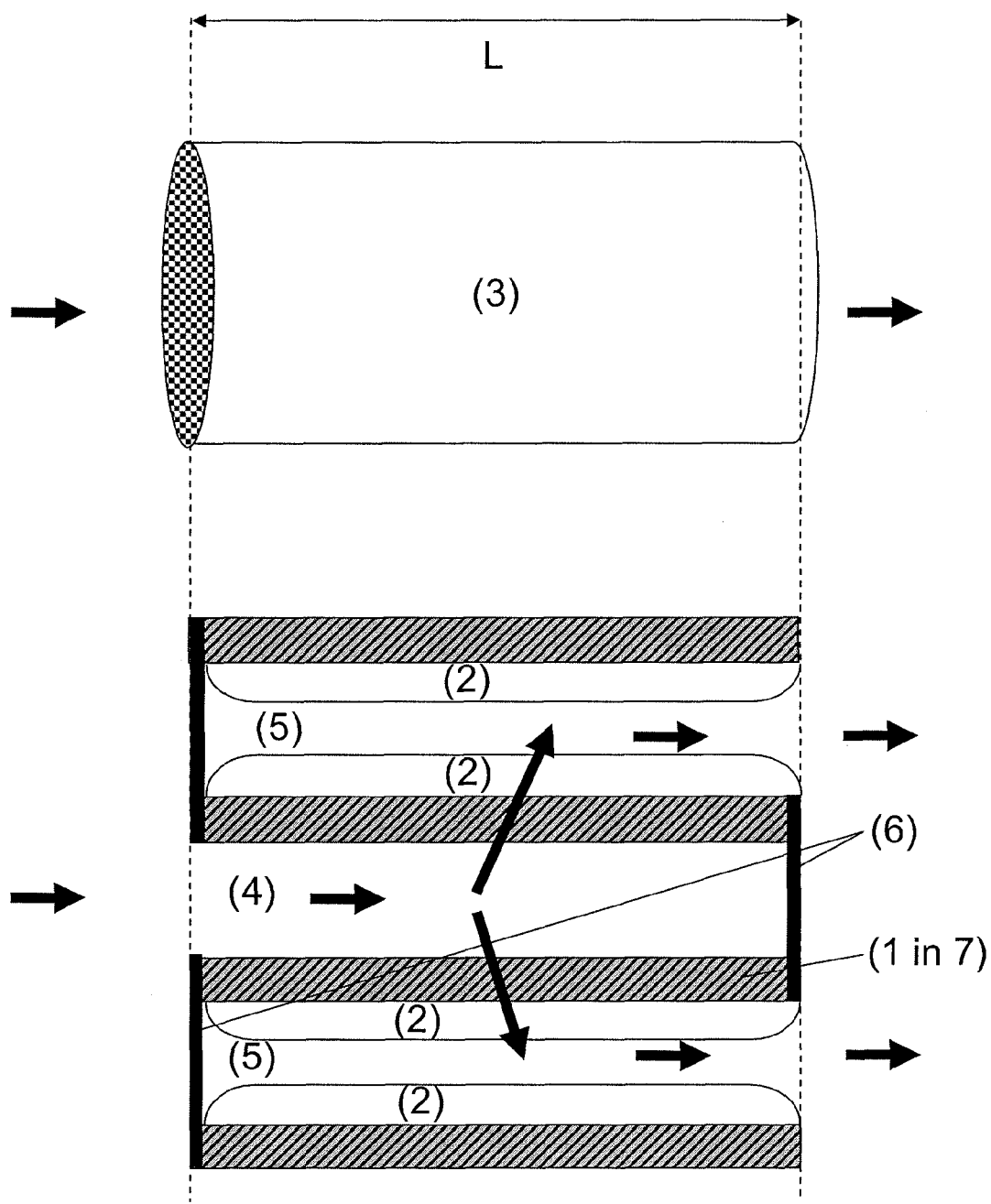

CATALYTICALLY ACTIVE PARTICULATE FILTER AND USE THEREOF

The invention concerns a catalytically active particulate filter and use thereof to clean the exhaust gases of diesel engines, in particular as part of an exhaust gas cleaning system containing a diesel oxidation catalyst, a diesel particulate filter and a catalyst for selective catalytic reduction of nitrous oxides, which are connected successively in this order in the flow direction of the exhaust gas.

The untreated exhaust gas from diesel engines contains, as well as carbon monoxide CO, hydrocarbons HC and nitrous oxides $NO_x$, a relatively high oxygen content of up to 15 vol. %. It also contains particulate emissions which consist primarily of soot residues and where applicable organic agglomerates, and arise from a partially incomplete fuel combustion in the cylinders.

The observation of exhaust limit values for diesel vehicles imposed by future laws in Europe, North America and Japan requires the simultaneous removal of particulates and nitrous oxides from the exhaust gas. The pollutant gases carbon monoxide and hydrocarbon from the lean exhaust gas can be rendered harmless by oxidation on a suitable oxidation catalyst. To remove the particulate emissions, diesel particulate filters with and without additional, catalytically active coating are suitable. The reduction of nitrous oxides into nitrogen ("denitrification" of the exhaust gas) is more difficult because of the high oxygen content. A known method is selective catalytic reduction (SCR) of the nitrous oxides on a suitable catalyst known as an SCR catalyst. This method is presently preferred for denitrification of diesel engine exhaust gases. In the SCR process, the nitrous oxides contained in the exhaust gas are reduced by means of a reducing agent introduced into the exhaust gas line from an external source. A preferred reducing agent is ammonium, wherein in particular compounds releasing ammonium such as urea or ammonium carbamate are added. The ammonium where applicable generated in situ in this manner from the precursor compound reacts at the SCR catalyst with the nitrous oxides from the exhaust gas into nitrogen and water in a corn proportioning reaction.

At the present time, a combination of different exhaust gas cleaning devices is unavoidable in order to meet the future legal requirements. A device for cleaning diesel engine exhaust gases must contain at least one oxidation-active catalyst, and for denitrification an SCR catalyst with an upstream device for introducing the reducing agent (preferably ammonium or urea solution) and an external reducing agent source (for example an additional tank with urea solution or an ammonium store). If optimisation of the engine combustion process does not succeed in keeping particulate emissions so low that these can be removed via the oxidation catalyst by direct oxidation with oxygen, in addition the use of a particulate filter is required. Here the use of special, catalytically activated particulate filters is possible. Such a particulate filter is disclosed for example in EP 1 486 248 A1. The diesel particulate filter has an inlet side for the inflowing exhaust gas and an outlet side for outflowing exhaust gas. It contains a substrate with an inner wall surface and an outer wall surface. A catalytically active coating is applied on the inner wall surface of the inlet side, while a second catalytically active coating is applied on the outer wall surface towards the outlet side. The catalytically active coatings can have various compositions and different catalytic functions.

Exhaust gas cleaning systems which are constructed from several exhaust gas cleaning devices connected in series are well known from the prior art; some are presently undergoing practical trials or are in series introduction. For example EP 1 054 722 A1 describes a system for treating diesel exhaust gases containing $NO_x$ and particulates, wherein an oxidation catalyst is connected upstream of a particulate filter. On the downstream side of the particulate filter are connected a reducing agent source and a metering device for the reducing agent, and an SCR catalyst. In the manner described here, the $NO_2$ proportion in the exhaust gas and hence the $NO_2/NO_x$ ratio is increased by at least partial oxidation of NO on the oxidation catalyst, wherein the $NO/NO_2$ ratio is preferably "set to a predefined level optimum for the SCR catalyst".

This $NO/NO_2$ ratio optimum for the SCR catalyst lies in the region of 1 for all SCR catalysts known at present. If the $NO_x$ contained in the exhaust gas consists solely of NO and $NO_2$, the optimum $NO_2/NO_x$ ratio is between 0.3 and 0.7, preferably between 0.4 and 0.6, and particularly preferably 0.5. Whether this ratio is achieved before the SCR catalyst in a system according to EP 1 054 722 A1 depends on the exhaust gas temperature and hence on the operating state of the engine, the activity of the oxidation catalyst, the precious metal charge, and the structure and soot charge of the diesel particulate filter connected downstream of the oxidation catalyst. The fact that the $NO/NO_2$ ratio in the exhaust gas is to be set via the oxidation catalyst, wherein the thus configured exhaust gas must still flow through the downstream diesel particulate filter before reaching the SCR catalyst, means that in dynamic normal operation of the vehicle it cannot always be ensured that this $NO/NO_2$ ratio in the exhaust gas after the particulate filter and before the SCR catalyst always lies in the range optimum for the SCR reaction. The result is $NO_x$ breakthrough due to incomplete reduction and/or ammonium breakthrough due to ammonium overdose.

WO 2009/140989 solves this problem by the use of a catalytically activated particulate filter in a system according to EP 1 054 722 A1 with simultaneous adaptation of the catalytic coating of the upstream oxidation catalyst. In a device for cleaning diesel exhaust gases which in the flow direction of the exhaust gas comprises an oxidation catalyst, a diesel particulate filter with catalytically active coating, a device for introducing a reducing agent from an external reducing agent source, and an SCR catalyst, both the oxidation catalyst and the catalytically active coating of the diesel particulate filter contain palladium and platinum. The ratio of the total quantity of palladium to the total quantity of platinum in the oxidation catalyst and particulate filter is between 8:1 and 1:15. Also the ratio of platinum to palladium in the oxidation catalyst is no greater than 6:1, while the catalytically active coating of the diesel particulate filter is selected such that the ratio of platinum to palladium present therein is no less than 10:1.

It is evident from present developments of diesel engines and applications that in future diesel engines, the exhaust gas to be cleaned—when it leaves the engine and enters the exhaust gas cleaning system—is becoming ever colder. The avoidance of additional heat losses via the exhaust line requires an ever more compact construction of the exhaust gas cleaning system. Consequently the installation volume available for the upstream oxidation catalyst is becoming ever smaller. The smaller dimensioning of the oxidation catalysts, in conjunction with the reduction in normal operating temperature, leads to the consequence that the hydrocarbons and carbon monoxide contained in the exhaust gases to be cleaned often can no longer be fully converted into carbon dioxide at the oxidation catalyst. Also under these conditions the oxidation catalyst is unable to set a $NO/NO_2$ ratio which is even only approximately optimum for denitrification of the exhaust gas in the SCR catalyst located at the end of the exhaust line. Consequently the residual emissions of carbon monoxide and in particular hydrocarbons, but also particularly environmentally critical nitrous oxides, remaining in the exhaust gas are too high to meet the future applicable exhaust gas limit values.

The object of the present invention is to provide an exhaust gas cleaning device for cleaning the exhaust gases from diesel engines which is suitable for use in an exhaust gas cleaning system with diesel oxidation catalyst, diesel particulate filter and SCR catalyst, without the above-mentioned disadvantages of conventional systems.

This object is achieved by a catalytically active particulate filter which removes soot particles from the exhaust gas and is able to oxidise carbon monoxide and hydrocarbon and to convert nitrogen monoxides at least proportionally into nitrogen dioxide.

The object of the present invention is a catalytically active particulate filter comprising
  as a filter body, a wall flow filter substrate (3) which comprises inflow and outflow channels separated by porous walls (7), wherein the outflow ends of the inflow channels (4) and the inflow ends of the outflow channels (5) are sealed gas-tight (6), and
  at least two catalytically active coatings, wherein the first catalytically active coating (1) contains platinum and palladium and is situated in the porous walls (7) between the inflow and outflow channels, and the second catalytically active coating (2) contains platinum or palladium and platinum and is situated in the outflow channels on the porous walls (7) between the inflow and outflow channels,
wherein the platinum content of the second catalytically active coating (2) is higher than the platinum content of the first catalytically active coating (1).

The object of the present invention is furthermore a method for reducing particulates, hydrocarbons and carbon monoxide in diesel engine exhaust gases, wherein the exhaust gas to be cleaned containing carbon monoxide, hydrocarbons, particulates and nitrous oxides, including nitrogen monoxide, is passed through a catalytically active particulate filter according to the invention.

The catalytically active particulate filter according to the invention is optimised for use in an exhaust gas system which for this on the inflow side has a diesel oxidation catalyst and on the outflow side a device for addition of ammonium or a compound releasing ammonium, and an SCR catalyst to convert nitrous oxides with ammonium into nitrogen.

The object of the present invention is therefore also an exhaust gas cleaning system which in the flow direction of the exhaust gas comprises an oxidation catalyst, a diesel particulate filter with catalytically active coating, a device for introducing a reducing agent from an external reducing agent source, and an SCR catalyst, which is characterized in that it contains a catalytically active particulate filter according to the invention as a diesel particulate filter with catalytically active coating.

Preferably the first catalytically active coating (1) has a Pt:Pd weight ratio of 1:4 to 2:1.

In a particular embodiment of the catalytically active particulate filter according to the invention, the first catalytically active coating contains one or more zeolite compounds which have a buffering effect against the hydrocarbons occurring in the diesel exhaust gas. These are preferably selected from the group of beta-zeolite, X-zeolite, Y-zeolite, mordenite and ZSM-5 zeolite.

Said zeolite compounds are preferably used in quantities of 0.5 to 20 g/l by volume of the wall flow filter substrate.

Preferably the first catalytically active coating (1) extends over the entire length of the wall flow filter substrate.

The composition of the first catalytically active coating is selected such that at moderate exhaust gas temperatures, it catalyses the oxidation of hydrocarbons and carbon monoxide into carbon dioxide as completely as possible. This guarantees that carbon monoxide and hydrocarbons which "break through" any upstream diesel oxidation catalyst are oxidised into carbon dioxide as fully as possible at the latest at this point in the exhaust gas cleaning system and consequently are not emitted to the environment.

The second catalytically active coating (2) has a higher platinum content than the first catalytically active coating (1). Preferably the platinum content of the second catalytically active coating (2) is 1.2 to 3 times higher than the platinum content of the first catalytically active coating (1).

Preferably the second catalytically active coating (2) contains more platinum than palladium. Particularly preferably the Pt:Pd weight ratio is more than 6:1, particularly preferably 12:1. In embodiments in which the second catalytically active coating (2) requires a particularly high oxidation power against nitrogen monoxide, it may contain only platinum and be free from palladium (weight ratio 1:0).

Preferably the second catalytically active coating (2) extends over the entire length of the wall flow filter substrate.

The second catalytically active coating (2) is composed such that it is able to oxidise at least part of the nitrogen monoxide contained in the exhaust gas into nitrogen dioxide in order thus in total to provide a greater quantity of $NO_2$ to the downstream SCR catalyst. This ensures that after passing through the catalytically active particulate filter according to the invention, the exhaust gas—depending on exhaust gas temperature and precious metal charge—has an $NO_2/NO_x$ ratio of 0.3 to 0.7, preferably 0.4 to 0.6, and particularly preferably 0.5.

The platinum and palladium, or platinum, contained in the two catalytically active coatings are usually present on an oxidic carrier material selected from the group consisting of aluminium oxide, silicon dioxide, rare earth oxide, titanium oxide and zirconium oxide, or mixed oxides, or mixtures thereof. A preferred oxidic carrier material is aluminium oxide which in particular is stabilised with lanthanum oxide. In the latter case lanthanum oxide is present preferably in quantities of 2 to 6 w. % in relation to the stabilised aluminium oxide.

The physical separation of the two catalytically active coatings according to the present invention surprisingly causes an overall improved conversion of all pollutants. In particular it leads to the fact that the NO conversion into $NO_2$ observed over the complete component is significantly higher than in conventional components in which the catalytically active constituents are present in a single coating.

The wall flow filter substrate preferably consists of a ceramic material such as for example cordierite, silicon carbide or aluminium titanate.

FIG. 1 shows the catalytically active particulate filter according to the invention in diagrammatic form. The first catalytically active coating (1) is arranged on the inflow channel side in the porous walls between the inflow channels (4) and outflow channels (5). The second catalytically active coating (2) is arranged on the outflow channel side on the walls between the inflow channels (4) and the outflow channels (5).

The soot particles cannot penetrate the porous walls and are completely filtered out of the exhaust gas on the inflow side. This has the advantage that the second catalytically active coating which is used for NO oxidation remains soot-free.

The catalytically active particulate filter according to the invention is suitable in particular for use in a method for reduction of particulates, hydrocarbons and carbon monoxide, wherein the exhaust gas to be cleaned contains, as well as the above-mentioned components, also nitrous oxides including nitrogen monoxide. The first catalytically active coating (1) is effective to oxidise hydrocarbons and carbon monoxide, while the second catalytically active coating (2) is effective to convert at least part of the nitrogen monoxide present in the exhaust gas into nitrogen dioxide. According to the method in the invention, not only are the hydrocarbons, carbon monoxide and particulates reduced in the exhaust gas to be cleaned. Also the $NO_2/NO_x$ ratio in the exhaust gas is set to a value of 0.3 to 0.7. Thus the exhaust gas is prepared in the optimum manner for the removal of nitrous oxides by comproportioning with ammonium at a downstream SCR catalyst.

For subsequent denitrification of the exhaust gas, downstream of the catalytically active particulate filter according to the invention, preferably in this order, are connected (a) a device for metered addition of ammonia or a compound releasing ammonium, and (b) an SCR catalyst which is effective to convert nitrous oxides with ammonium into nitrogen. The total cleaning effect of the method is further increased if furthermore upstream of the catalytically active particulate filter according to the invention is connected an oxidation catalyst which is effective to oxidise carbon monoxide and hydrocarbons.

As a whole, a highly effective exhaust gas cleaning system is achieved for reducing hydrocarbons, carbon monoxide, particulates and nitrous oxides from the exhaust gases of diesel engines, which features substantially improved cleaning efficiency in comparison with systems according to the prior art. In particular the system according to the invention is suitable for cleaning the exhaust gases of more modern diesel engines, the exhaust gases of which have comparatively low temperatures.

The invention is now explained in more detail below with reference to some examples and figures. These show:

FIG. 1: a diagrammatic depiction of a catalytically active particulate filter according to the invention comprising:
- (1) a first catalytically active coating which is effective to oxidise hydrocarbons and carbon monoxide;
- (2) a second catalytically active coating which is effective to convert at least part of the nitrogen monoxide present in the exhaust gas into nitrogen dioxide;
- (3) as a filter body, a wall flow filter substrate comprising:
- (4) inflow channels through which exhaust gas flows into the substrate;
- (5) outflow channels through which the exhaust gas flows out of the substrate; wherein
- (6) both inflow channels and outflow channels are each closed gas-tight on one side.

EXAMPLE

For production of a particulate filter according to the invention, a wall flow filter substrate of silicon carbide was fitted with coatings (1) and (2) as indicated diagrammatically in FIG. 1. The substrate had a diameter of 143.8 millimeters and a length of 152.4 millimeters. It had a cell density of 300 cells per square centimeter with a wall thickness of 0.33 millimeters. The total cell charge was 35.4 g/ft$^3$ with a Pt/Pd ratio of 6.1:1.

a) First a coating suspension was created to produce the coating (1) suitable for oxidation of hydrocarbons and carbon dioxide. For this an aluminium oxide stabilised with lanthanum oxide (4 w. % $La_2O_3$ in relation to the total mass of the mixed oxide, BET surface approx. 180 m$^2$/g) was moistened with a water-based solution of tetra-amine platinum acetate and tetra-amine palladium nitrate, filling the pores, wherein the pourability of the powder was retained.

The precious metal content of the solution and the precious metal ratio were selected according to the target quantity to be achieved and the precious metal ratio to be achieved in the coating (1). The target charge was 15 g/ft$^3$ with a Pt/Pd ratio of 2.1:1.

To fix the precious metal, the damp powder was calcinated for 4 hours at 300° C.

The resulting catalytically activated powder was suspended in water, provided with a zeolite and ground after setting the pH until it had a particle size distribution with a $d_{100}$ value of less than 7 micrometers. The coating of the wall flow filter substrate was applied partly by machine. For this the filter substrate was oriented vertically in the coating chamber of a coating machine according to the prior art so that the inlet face of the later inflow side of the component faced downwards. Then the coating suspension (1) was pumped into the substrate from below until the inflow channels of the substrate were filled with suspension over their entire length. Then the coating suspension (1) was pumped out again from below and then extracted, wherein the pump-out or extraction power was selected such that the proportion of solids contained in the suspension remained in the channel walls of the wall flow filter substrate in the desired quantity. A coating quantity to be applied of 15 to 20 grammes per liter in relation to the substrate volume was selected and introduced into the wall of the wall flow filter substrate.

b) For production of the coating (2) suitable for at least partial oxidation of NO, the procedure was similar to the process described above. The washcoat provided for the coating (2) was ground to a particle size of 8-10 micrometers ($d_{100}$) and applied to the wall of the outlet channel by an immersion coating process from the outlet end of the wall flow filter substrate. The target charge of the coating (2) was 20.4 g/ft$^3$ with a Pt/Pd ratio of 1:0.

The resulting catalytically activated diesel particulate filter was calcinated for a period of 4 hours at 300° C. and then treated with forming gas for 2 hours at 500° C.

The resulting catalytically active particulate filter was subjected to a synthetic ageing procedure before characterisation. For this the filter bodies were exposed to an atmosphere of 10 vol. % water vapour and 10 vol. % oxygen in nitrogen for a duration of 16 hours in an oven at 800° C.

Comparison Examples 1 and 2

For comparison, two wall filter substrates were coated conventionally, i.e. the entire charge was introduced homogeneously into the channel walls of the substrate. The coating thus corresponded to coating (1) of the particulate filter according to the invention in the example but contained the entire quantity of precious metal.

First coating suspensions were produced. For this an aluminium oxide stabilised with lanthanum oxide (4 w. % $La_2O_3$ in relation to the total mass of the mixed oxide, BET surface approx. 180 m$^2$/g) was moistened with a water-based solution of tetra-amine platinum acetate and tetra-amine palladium nitrate, filling the pores, wherein the pourability of the powder was retained. The precious metal content of the solution and the precious metal ratio were selected according to the target quantities and ratios to be achieved. The target charge of comparison example 1 was 34 g/ft$^3$ with a Pt/Pd ratio of 12:1 (cost equivalence), and of comparison example 2, 40 g/ft$^3$ with a Pt/Pd ratio of 2:1.

To fix the precious metal, the damp powder was calcinated for 4 hours at 300° C.

The resulting catalytically activated powder was suspended in water, provided with a zeolite and ground after setting the pH until it had a particle size distribution with a $d_{100}$ value of less than 7 micrometers.

The coating of the wall flow filter substrate was applied partly by machine. For this the filter substrate was oriented vertically in the coating chamber of a coating machine according to the prior art so that the inlet face of the later inflow side of the component faced downwards. Then the coating suspension concerned was pumped into the substrate from below until the inflow channels of the substrate were filled with suspension over their entire length. Then the coating suspension was pumped out again from below and then extracted, wherein the pump-out or extraction power was selected such that the proportion of solids contained in the suspension remained in the channel walls of the wall flow filter substrate in the desired quantity.

A coating quantity to be applied of 15 to 20 grammes per liter in relation to the substrate volume was selected and introduced into the wall of the DPF.

The comparison specimens had a charge of 34 g/ft$^3$ and 40 g/ft$^3$ with a precious metal ratio of Pt/Pd of 12:1 and 2:1. These charges are cost-equivalent to the catalytically active particulate filter described in example 1.

The resulting comparison filters were hydrothermally aged in the same way as described for example 1.

Comparison Experiment

After the hydrothermal ageing described above, the catalytically active particulate filter according to the invention according to example 1 and the comparison filters according to the comparison examples were connected in succession in a DPF canning to an exhaust gas line of a 2.0 l diesel engine of standard Euro 4 and exposed to approximately 8 g/l soot. After the end of the sooting process, the temperature was ramped up to 300° C. and the so-called light-off of the particulate filter and NO$_2$ formation measured.

For the same HO/CO performance, the catalytically active particulate filter according to the invention had a 30% (relative) higher NO$_2$ formation after sooting than the conventionally coated comparison filter. The catalytically active particulate filter according to the invention therefore provides a substantially better performance for the same precious metal costs.

The invention claimed is:

1. Catalytically active particulate filter comprising
   as a filter body, a wall flow filter substrate which comprises inflow and outflow channels separated by porous walls, wherein the outflow ends of the inflow channels and the inflow ends of the outflow channels are sealed gas-tight, and
   at least two catalytically active coatings, wherein the first catalytically active coating contains platinum and palladium and is situated in the porous walls between the inflow and outflow channels, and the second catalytically active coating contains platinum or palladium and platinum and is situated in the outflow channels on the porous walls between the inflow and outflow channels,
   wherein the platinum content of the second catalytically active coating is higher than the platinum content of the first catalytically active coating.

2. Catalytically active particulate filter according to claim 1, wherein the first catalytically active coating has a Pt:Pd weight ratio of 1:4 to 2:1.

3. Catalytically active particulate filter according to claim 1 wherein the first catalytically active coating contains one or more zeolite compounds.

4. Catalytically active particulate filter according to claim 1, wherein the first catalytically active coating extends over the entire length of the wall flow filter substrate.

5. Catalytically active particulate filter according to claim 1, wherein the second catalytically active coating contains more platinum than palladium.

6. Catalytically active particulate filter according to claim 1, wherein the second catalytically active coating has a Pt:Pd weight ratio of more than 6:1.

7. Catalytically active particulate filter according to claim 1, wherein the second catalytically active coating extends over the entire length of the wall flow filter substrate.

8. Catalytically active particulate filter according to claim 1, wherein a wall flow filter substrate of ceramic material is used as the filter body.

9. A method for reduction of particulates, hydrocarbons and carbon monoxide in diesel engine exhaust gas, comprising; passing the exhaust gas to be cleaned containing carbon monoxide, hydrocarbons, particulates and nitrous oxides, including nitrogen monoxide, through a catalytically active particulate filter according to claim 1.

10. Method according to claim 9, wherein after passing through the catalytically active particulate filter, the exhaust gas has a NO$_2$/NO$_x$ ratio of 0.3 to 0.7.

11. Method according to claim 9, wherein downstream of the catalytically active particulate filter, in this order, the exhaust gas is subjected to
   (a) a device for metered addition of ammonium or a compound releasing ammonium, and
   (b) an SCR catalyst which is effective to convert nitrous oxides with ammonium into nitrogen.

12. Method according to claim 9, wherein upstream of the catalytically active particulate filter is connected an oxidation catalyst which is effective to oxidise carbon monoxide and hydrocarbons in the exhaust gas.

13. An exhaust gas cleaning system which in the flow direction of the exhaust gas comprises an oxidation catalyst, a diesel particulate filter, a device for introducing a reducing agent from an external reducing agent source, and an SCR catalyst, wherein the diesel particulate filter is a catalytically active particulate filter according to claim 1.

* * * * *